US010991396B2

(12) United States Patent
Patry et al.

(10) Patent No.: US 10,991,396 B2
(45) Date of Patent: *Apr. 27, 2021

(54) SYSTEMS AND METHODS FOR MODIFYING VIDEOS BASED ON MUSIC

(71) Applicant: GoPro, Inc., San Mateo, CA (US)

(72) Inventors: Jean Patry, Paris (FR); Guillaume Oulès, Bordeaux (FR)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/884,904

(22) Filed: May 27, 2020

(65) Prior Publication Data
US 2020/0286520 A1 Sep. 10, 2020

Related U.S. Application Data

(63) Continuation of application No. 16/188,679, filed on Nov. 13, 2018, now Pat. No. 10,679,670, which is a continuation of application No. 15/447,738, filed on Mar. 2, 2017, now Pat. No. 10,127,943.

(51) Int. Cl.
*G11B 27/031* (2006.01)
*H04N 5/76* (2006.01)

(52) U.S. Cl.
CPC ............ *G11B 27/031* (2013.01); *H04N 5/76* (2013.01)

(58) Field of Classification Search
CPC .................................. G11B 27/031; H04N 5/76
See application file for complete search history.

(56) References Cited

U.S. PATENT DOCUMENTS

| 5,130,794 | A  | 7/1992 | Ritchey |
| 6,337,683 | B1 | 1/2002 | Gilbert |
| 6,593,956 | B1 | 7/2003 | Potts |
| 7,222,356 | B1 | 5/2007 | Yonezawa |
| 7,483,618 | B1 | 1/2009 | Edwards |

(Continued)

FOREIGN PATENT DOCUMENTS

| WO | 2001020466    | 3/2001 |
| WO | 2009040538 A1 | 4/2009 |

OTHER PUBLICATIONS

Ernoult, Emeric, 'How to Triple Your YouTube Video Views with Facebook', SocialMediaExaminer.com, Nov. 26, 2012, 16 pages.

(Continued)

*Primary Examiner* — Thai Q Tran
*Assistant Examiner* — Sunghyoun Park
(74) *Attorney, Agent, or Firm* — Esplin & Associates, PC

(57) ABSTRACT

Video information defining video content may be accessed. Music information defining a music track providing an accompaniment for video content may be accessed. The music track may have pulses and one or more music events. Individual music events may correspond to different moments within the music track. One or more music events may be individually classified into one or more categories based on intensities of one or pulses occurring within the music event. One or more visual effects may be selected for different moments within the music track based on the categories of the music events. One or more visual effects may be applied to the video content. One or more visual effects may be applied to one or more moments within the video content aligned to one or more different moments within the music track.

20 Claims, 7 Drawing Sheets

(56) References Cited

U.S. PATENT DOCUMENTS

| | | |
|---|---|---|
| 8,446,433 B1 | 5/2013 | Mallet |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 2004/0128317 A1 | 7/2004 | Sull |
| 2005/0025454 A1 | 2/2005 | Nakamura |
| 2005/0182503 A1 | 8/2005 | Lin |
| 2005/0251532 A1 | 11/2005 | Radhakrishnan |
| 2005/0259958 A1 | 11/2005 | Johansson |
| 2006/0122842 A1 | 6/2006 | Herberger |
| 2007/0173296 A1 | 7/2007 | Hara |
| 2007/0204310 A1 | 8/2007 | Hua |
| 2007/0230461 A1 | 10/2007 | Singh |
| 2008/0044155 A1 | 2/2008 | Kuspa |
| 2008/0101762 A1 | 5/2008 | Kellock |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183751 A1 | 7/2008 | Cazier |
| 2008/0208791 A1 | 8/2008 | Das |
| 2008/0253735 A1 | 10/2008 | Kuspa |
| 2008/0313541 A1 | 12/2008 | Shafton |
| 2009/0213270 A1 | 8/2009 | Ismert |
| 2009/0263100 A1 | 10/2009 | Neuman |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0054694 A1 | 3/2010 | Liu |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0071089 A1 | 3/2013 | Fujimoto |
| 2013/0078990 A1 | 3/2013 | Kim |
| 2013/0108244 A1 | 5/2013 | Konuma |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0302005 A1 | 11/2013 | Harwell |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0023348 A1* | 1/2014 | O'Kelly ............... G11B 27/031 386/278 |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1* | 11/2014 | Cheng ............... H04N 21/44008 386/241 |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0155006 A1* | 6/2015 | Chou ................. H04N 9/802 386/230 |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |

(56) References Cited

U.S. PATENT DOCUMENTS

| | | | |
|---|---|---|---|
| 2015/0382083 A1 | 12/2015 | Chen | |
| 2016/0005440 A1 | 1/2016 | Gower | |
| 2016/0026874 A1 | 1/2016 | Hodulik | |
| 2016/0027470 A1 | 1/2016 | Newman | |
| 2016/0027475 A1 | 1/2016 | Hodulik | |
| 2016/0029105 A1 | 1/2016 | Newman | |
| 2016/0055885 A1 | 2/2016 | Hodulik | |
| 2016/0088287 A1 | 3/2016 | Sadi | |
| 2016/0098941 A1 | 4/2016 | Kerluke | |
| 2016/0119551 A1 | 4/2016 | Brown | |
| 2016/0217325 A1 | 7/2016 | Bose | |
| 2016/0225405 A1 | 8/2016 | Matias | |
| 2016/0225410 A1 | 8/2016 | Lee | |
| 2016/0234345 A1 | 8/2016 | Roberts | |
| 2016/0247533 A1* | 8/2016 | Tanaka | G11B 27/031 |
| 2016/0336039 A1* | 11/2016 | Leiberman | G11B 27/34 |
| 2016/0358603 A1 | 12/2016 | Azam | |
| 2016/0364963 A1 | 12/2016 | Matsuoka | |
| 2016/0366330 A1 | 12/2016 | Boliek | |
| 2017/0006214 A1 | 1/2017 | Andreassen | |

OTHER PUBLICATIONS

Han et al., Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512.03385, 2015,12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Parkhi et al., 'Deep Face Recognition,' Proceedings of the British Machine Vision, 2015,12 pgs.

PCT International Search Reort for PCT/US15/18538 dated Jun. 16, 2015 (2 pages).

PCT International Search Report and Written Opinion for PCT/US15/12086 dated Mar. 17, 2016, 7 pages.

PCT International Search Report for PCT/US15/23680 dated Aug. 3, 2015, 4 pages.

PCT International Search Report for PCT/US15/41624 dated Nov. 4, 2015, 5 pages.

PCT International Search Report for PCT/US17/16367 dated Apr. 14, 2017 (2 pages).

Ricker, 'First Click: TomTom's Bandit camera beats GoPro with software' Mar. 9, 2016 URL: http://www.theverge. com/2016/3/9/11179298/tomtom-bandit-beats-gopro (6 pages).

Schroff et al., 'FaceNet: A Unified Embedding for Face Recognition and Clustering,' IEEE Conference on Computer Vision and Pattern Recognition (CVPR), 2016, 10 pgs.

Tran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights Via Robust Recurrent Auto-encoders' arXiv:1510.01442v1 [cs.CV] Oct. 6, 2015 (9 pgs).

PCT International Search Report and Written Opinion for PCT/US15/18538, dated Jun. 16, 2015, 26 pages.

PCT International Written Opinion for PCT/US2015/041624, dated Dec. 17, 2015, 7 Pages.

PCT International Preliminary Report on Patentability for PCT/US2015/023680, dated Oct. 4, 2016, 10 pages.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

PCT International Search Report and Written Opinion for PCT/US16/31076, dated Aug. 8, 2016, 19 Pages.

* cited by examiner

SYSTEMS AND METHODS FOR MODIFYING VIDEOS BASED ON MUSIC

FIELD

This disclosure relates to modifying video content based on music that provides an accompaniment for the video content.

BACKGROUND

Video editing applications may allow users to manually edit video clips to introduce visual effects. Music tracks may accompany playback of video clips. Manually editing video clips to introduce visual effects based on accompanying music tracks may be time consuming and may discourage users from modifying video clips based on music tracks.

SUMMARY

This disclosure relates to modifying videos based on music. Video information defining video content may be accessed. Music information defining a music track may be accessed. The music track may provide an accompaniment for the video content. The music track may have pulses and one or more music events. Individual music events may correspond to different moments within the music track. One or more music events may be individually classified into one or more categories based on intensities of one or pulses occurring within the music event. One or more visual effects may be selected for different moments within the music track based on the categories of the music events. One or more visual effects may be applied to the video content. One or more visual effects may be applied to one or more moments within the video content aligned to one or more different moments within the music track.

A system that modifies videos based on music may include one or more physical processors, and/or other components. The processor(s) may be configured by machine-readable instructions. Executing the machine-readable instructions may cause the processor(s) to facilitate modifying videos based on music. The machine-readable instructions may include one or more computer program components. The computer program components may include one or more of an access component, a visual effects selection component, a visual effects application component, and/or other computer program components. In some implementations, the computer program components may include a music track analysis component.

The access component may be configured to access the video information defining one or more video content and/or other information. The access component may access video information from one or more storage locations. The access component may be configured to access video information defining one or more video content during acquisition of the video information and/or after acquisition of the video information by one or more image sensors.

The access component may be configured to access music information defining one or more music tracks and/or other information. The access component may access music information from one or more storage locations. The access component may access particular music information based on user selection, system information, video content, and/or other information.

A music track may provide an accompaniment for the video content. The music track may have pulses. The music track may have one or more music events. Individual music events may correspond to different moments within the music track. One or more music events may be individually classified into one or more categories based on intensities of one or more pulses occurring within the music event and/or other information. In some implementations, one or more music events may be classified into one or more categories based on the intensities of the one or more pulses within a low frequency range, a middle frequency range, and a high frequency range. In some implementations, one or more categories may include a weak category, an average category, a strong category, an intense category, and/or other categories.

In some implementations, one or more consecutive pulses within the music track may be grouped based on similarity of the intensities within the low frequency range, the middle frequency range, and the high frequency range. In some implementations, one or more consecutive pulses within the music track may be grouped based on a hidden Markov model and/or other information.

The music track analysis component may be configured to analyze the music track to classify the music event(s) within a music track into one or more categories. The music track analysis component may classify the music event(s) based on the intensities of one or more pulses occurring within the music event and/or other information. The music track analysis component may classify the music event(s) based on the intensities of the one or more pulses within a low frequency range, a middle frequency range, and a high frequency range. In some implementations, the music track analysis component may classify the music event(s) into a weak category, an average category, a strong category, an intense category, and/or other categories.

The visual effects selection component may be configured to select one or more visual effects for one or more of the different moments within the music track. The visual effects selection component may select one or more visual effects based on the categories of the one or more music events corresponding to the different moments within the music track and/or other information. In some implementations, the visual effects selection component may select one or more visual effects based on grouping(s) of consecutive pulses within the music track. In some implementations, the visual effects selection component may select one or more visual effects based on a user selection. In some implementations, the visual effects selection component may select one or more visual effects randomly from a list of visual effects.

A visual effect may refer to a change in presentation of the video content on a display. A visual effect may change the presentation of the video content for a video frame, for multiple frames, for a point in time, and/or for a duration of time. In some implementations, a visual effect may include one or more changes in perceived speed at which the video content is presented during playback. In some implementations, a visual effect may include one or more visual transformation of the video content.

The visual effects application component may be configured to apply one or more visual effects to the video content. The visual effects application component may apply one or more visual effects to one or more moments within the video content aligned to one or more of the different moments that correspond to the music event(s) within the music track. The visual effects application component may apply the visual effect(s) upon a request for playback of the video content. The visual effects application component may generate one or more files describing the visual effects and/or one or more files containing video content altered based on the application of the visual effects.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
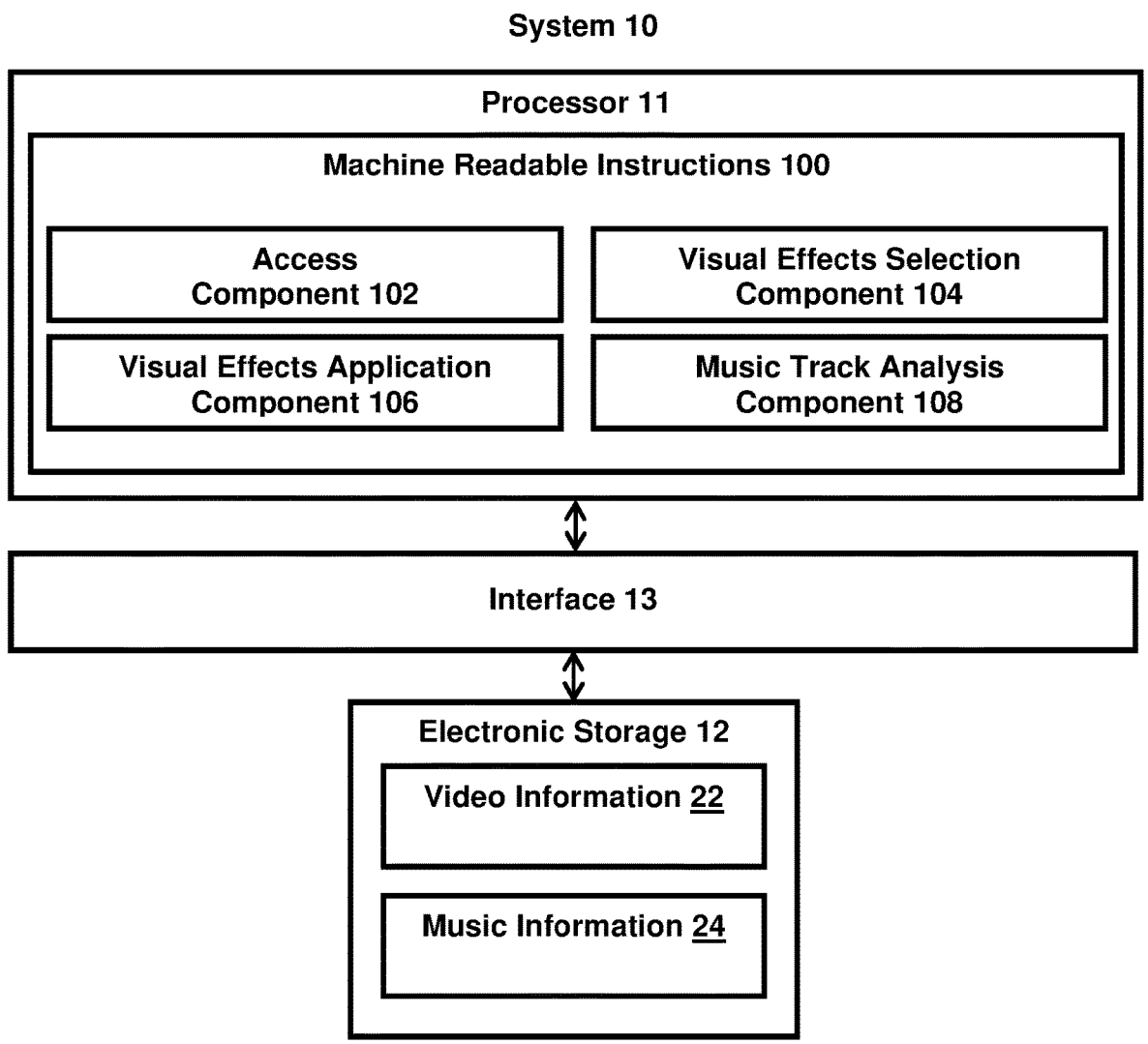
FIG. 1 illustrates a system that modifies videos based on music.

FIG. 1 illustrates system 10 for modifying videos based on music. System 10 may include one or more of processor 11, electronic storage 12, interface 13 (e.g., bus, wireless interface), and/or other components. Video information 22 defining video content may be accessed by processor 11. Music information 24 defining a music track may be accessed. The music track may provide an accompaniment for the video content. The music track may have pulses and one or more music events. Individual music events may correspond to different moments within the music track. One or more music events may be individually classified into one or more categories based on intensities of one or pulses occurring within the music event. One or more visual effects may be selected for different moments within the music track based on the categories of the music events. One or more visual effects may be applied to the video content. One or more visual effects may be applied to one or more moments within the video content aligned to one or more different moments within the music track.

Electronic storage 12 may be configured to include electronic storage medium that electronically stores information. Electronic storage 12 may store software algorithms, information determined by processor 11, information received remotely, and/or other information that enables system 10 to function properly. For example, electronic storage 12 may store information relating to video information, video content, music information, music track, pulses, intensities of the pulses, music event categories, visual effects, and/or other information.

Electronic storage 12 may store video information 22 defining one or more video content. Video content may refer to media content that may be consumed as one or more videos. Video content may include one or more videos stored in one or more formats/container, and/or other video content. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Electronic storage 12 may store music information 24 defining one or more music tracks. Music tracks may refer to media content that may be consumed as one or more audios. Music tracks may include recorded music, synthesized music, and/or otherwise produced music. Music track may have progress lengths. Progress lengths may be defined in terms of time durations.

Referring to FIG. 1, processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate modifying videos based on music. Machine readable instructions 100 may include one or more computer program components. Machine readable instructions 100 may include one or more of access component 102, visual effects selection component 104, visual effects application component 106, and/or other computer program components. In some implementations, the machine readable instructions 100 may include music track analysis component 108.

Access component 102 may be configured to access video information defining one or more video content and/or other information. Access component 102 may access video information from one or more storage locations. A storage location may include electronic storage 12, electronic storage of one or more image sensors (not shown in FIG. 1), and/or other locations. For example, access component 102 may access video information 22 stored in electronic storage 12. Access component 102 may be configured to access video information defining one or more video content during acquisition of the video information and/or after acquisition of the video information by one or more image sensors. For example, access component 102 may access video information defining a video while the video is being captured by one or more image sensors. Access component 102 may access video information defining a video after the video has been captured and stored in memory (e.g., electronic storage 12).

Access component 102 may be configured to access music information defining one or more music tracks and/or other information. Access component 102 may access music information from one or more storage locations. A storage location may include electronic storage 12, electronic storage of one or more computing devices (not shown in FIG. 1), and/or other locations. For example, access component 102 may access music information 24 stored in electronic storage 12.

Access component 102 may access particular music information (e.g., music information 24) based on user selection, system information, video content, and/or other information. For example, access component 102 may access particular music information defining a particular music track based on a user's selection of the music track to use as accompaniment for the video content. Access component 102 may access particular music information defining a particular music track based on a system setting (e.g., last selected music track, next music track, default music track, video summary template specifying a particular music track). Access component 102 may access particular music information defining a particular music track based on what is captured (e.g., activity, object, scene, movement, person, emotion) within the video content. Access of music information based on other parameters are contemplated.

A music track may provide an accompaniment for the video content. A music track may provide a song, music, and/or other sounds for play with the playback of one or more portions of or the entire the video content. The music track may be included in a file separate from the file containing the video content or may be included in the same file as the video content. The music track may be encoded with the video content.

Figure 3A:
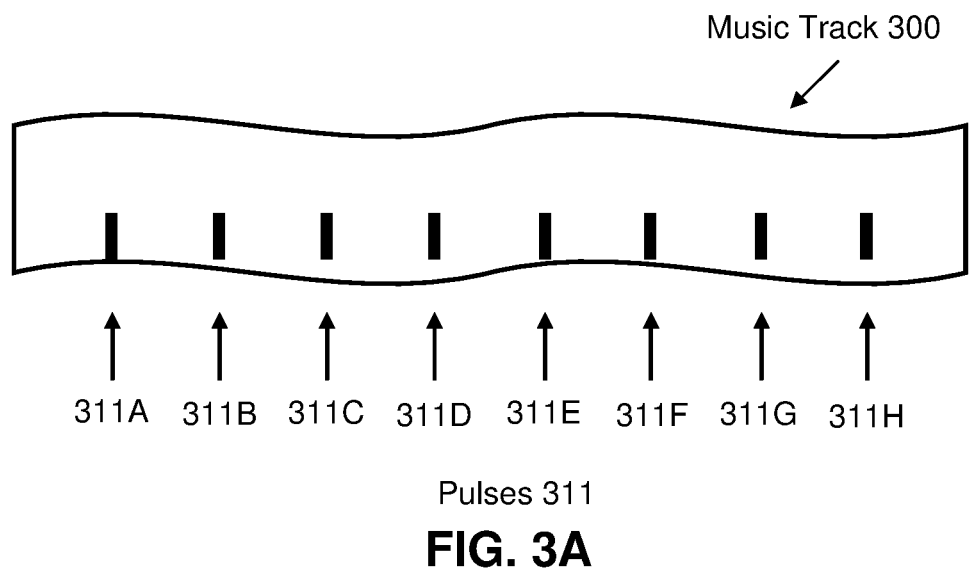
FIG. 3A illustrates pulses within an example music track.

A music track may have pulses. A pulse may refer to the beginning of a musical note or other sounds. In some implementations, pulses may occur at a periodic interval from other pulses. Repetition of pulses at periodic duration may be perceived as "beats" in a (repeating) series. The pulses that occur at periodic interval may be grouped based on accents/emphasis of the pulses. For example, pulses consisting of a strong/stressed pulse, a weak/unstressed pulse, and a weak/unstressed pulse may form a pulse group. A reoccurring pulse-group may form a meter of the music track. For example, FIG. 3A illustrates an example music track 300. Music track 300 may have pulses 311 that occur at a period interval from other pulses. Pulses 311 may include pulses 311A, 311B, 311C, 311D, 311E, 311F, 311G, 311H. In some implementations, pulses 311 may include strong/stressed pulse of pulse groups. Other regular/irregular pulses are contemplated.

Figure 3B:
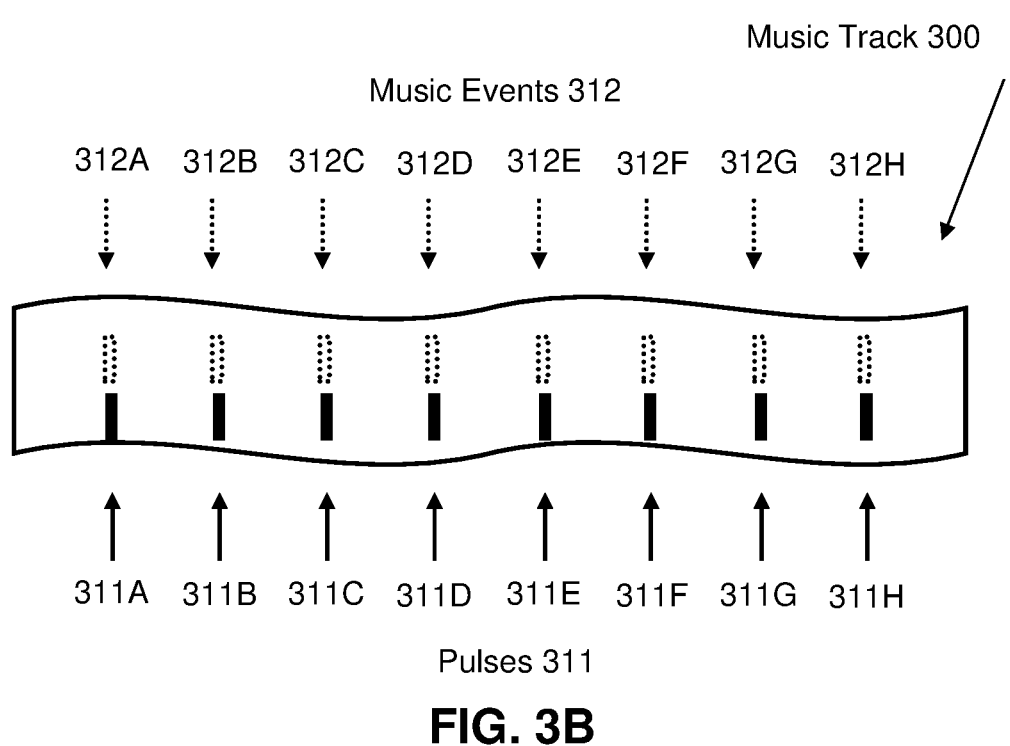
FIG. 3B illustrates music events within an example music track.

A music track may have one or more music events. A music event may refer to one or more occurrences of particular sound(s) in the music track. A music event may refer to occurrences of regular patterns or irregular patterns of sounds in the music track. A musical event may refer to one or more changes in the sound(s) in the music track. The particular sound(s)/changes in sound(s) in the music track may be of interest to a viewer/user of the video content with the music track providing accompaniment. Music events may be determined based on/indicate occurrence of one of more of a beat, a tempo, a rhythm, an instrument, a volume, a vocal, a chorus, a frequency, a style, a start, an end, and/or other sounds occurring within the music track. For example, referring to FIG. 3B, music event(s) 312 (312A, 312B, 312C, 312D, 312E, 312F, 312G, 312H) may refer to occurrences of pulses 311 (311A, 311B, 311C, 311D, 311E, 311F, 311G, 311H) within music track 300. Music events may be determined based on/indicate occurrence of change in one or more of a beat, a tempo, a rhythm, an instrument, a volume, a vocal, a chorus, a frequency, a style, a start, an end, and/or other sounds occurring within the music track. For example, music events may be determined based on/indicate occurrence of start/end, parts (e.g., chorus, verse), transitions between parts (e.g., drops/releases/ramps), phrases (e.g., musical phrases, instruments phrases), hits (e.g., intense percussion sounds related/unrelated to the rhythm grid), bars, beats, strong beats, semi-quaver, quavers, and/or other sounds. Music events may be determined based on/indicate occurrence of timing events (e.g., beats, hits) or time-range events (e.g., parts, phrases). In some implementations, music events may be determined based on user input (e.g., manually specified music event). Other types of music events are contemplated.

Individual music events may correspond to different moments within the music track. A moment within the music track may include a point in time within the music track or a duration of time within the music track. A music event may correspond to a point in time within the music track or a duration of time within the music track. For example, referring to FIG. 3B, one or more of music events 312 may correspond to moments within music track 300 corresponding to the occurrences of one or more of pulses 311. One or more of music events 312 may correspond to moments within music track 300 corresponding to occurrences of pulse groups in which pulses 311 are strong/stressed pulses.

One or more music events may be individually classified into one or more categories based on intensities of one or more pulses occurring within the music event and/or other information. Intensities of one or more pulses may include one or more of energy and/or amplitude of the pulses. In some implementations, one or more music events may be classified into one or more categories based on user input (e.g., manual classification of music events). In some implementations, the pulses may be classified into one or more categories based on their intensities and the music events may be classified into one or more categories based on the classification of the pulses. One or more categories may be associated with different values (e.g., ranges) of intensities of the pulses and one or more music events/pulses may be classified based on the values (e.g., individual, summed total) of the intensities of the pulses. In some implementations, categories of music events/pulses may include a weak category, an average category, a strong category, and an intense category. Other categories are contemplated.

In some implementations, one or more music events may be classified into one or more categories based on the intensities of one or more pulses within multiple frequency ranges. In some implementations, multiple frequency ranges may include a low frequency range, a middle frequency range, a high frequency range, and/or other frequency ranges. For example, a music track may be converted into a frequency space for analysis. Intensities of the pulses may be analyzed within multiple frequency ranges. For example, frequency ranges may include a low frequency range between 100-600 Hz; a middle frequency range between 1000-5000 Hz; and a high frequency range above 5000 Hz. As another example, frequency ranges may include a sub frequency range between 20-40 Hz; a low-end frequency range between 40-160 Hz; a low-mid frequency range between 160-300 Hz; a mid-end frequency range between 300-1000 Hz; a mid-high frequency range between 1000-5000 Hz; and a high-end frequency range between 5000-20000 Hz. Other frequency ranges are contemplated.

The intensities of the pulses within the individual frequency ranges may be used to classify the pulses/music events. The intensities of multiple pulses may be combined (e.g., summed, averaged) to determine into which category the pulses/music events will be classified. The categories may indicate the energy states of the music track/music events based on the analysis of the pulses.

In some implementations, one or more consecutive pulses within the music track may be grouped based on similarity of the intensities within multiple frequency ranges (e.g., the low frequency range, the middle frequency range, and the high frequency range). The similarity of the intensities within the frequency ranges may indicate that the consecutive pulses correspond to a same part of the music track. In some implementations, one or more consecutive pulses within the music track may be grouped based on a hidden Markov model and/or other information.

In some implementations, one or more music events may be individually classified into one or more categories based on occurrences of other sound(s) within or near the music events. One or more music events may be classified based on structure of the music track. One or more music events may be classified based on whether the music event is within or near (e.g., at the beginning of/introduces, at the end of/terminates) an introduction section, a verse section, a pre-chorus section, a chorus section, a refrain section, a bridge section, an instrumental section, a solo section, a conclusion section, and/or other sections. One or more music event may be classified based on other characteristics (e.g., volume, tempo) of sounds that that occur within the music track.

Music track analysis component 108 may be configured to analyze the music track to classify the music event(s) within a music track into one or more categories. Music track analysis component 108 may classify the music event(s) based on the intensities of one or more pulses occurring within the music event and/or other information. In some implementations, the pulses may occur at a periodic interval from other pulses. Music track analysis component 108 may analyze and quantify the intensities (e.g., energy, amplitude) of the pulses. In some implementations, music track analysis component 108 may classify the music event(s) based on the intensities of the one or more pulses within multiple frequency ranges (e.g., a low frequency range, a middle frequency range, and a high frequency range). The intensities of multiple pulses may be combined (e.g., summed, averaged) to determine into which category the pulses/music events may be classified.

In some implementations, music track analysis component 108 may classify the pulses/music event(s) into a weak category, an average category, a strong category, an intense category, and/or other categories. Other categories are contemplated. In some implementations, the categorization of the pulses/music events may be stored in electronic storage (e.g., electronic storage 12). In some implementations, the categorization of the pulses/music events may be stored with the music track or separately from the music track.

Visual effects selection component 104 may be configured to select one or more visual effects. A visual effect may refer to a change in presentation of the video content on a display. A visual effect may change the presentation of the video content for a video frame, for multiple frames, for a point in time, and/or for a duration of time.

In some implementations, a visual effect may include one or more changes in perceived speed at which the video content is presented during playback. For example, the video content may normally played at a perceived speed of 1× (e.g., a video captured at 30 frames/second is displayed at 30 frames/second). A visual effect may change the perceived speed of the video content playback (e.g., increase perceived speed of playback from 1× to 2×; decrease perceived speed of playback from 1× to 0.3×) for one or more portions of the video content.

Figure 4A:
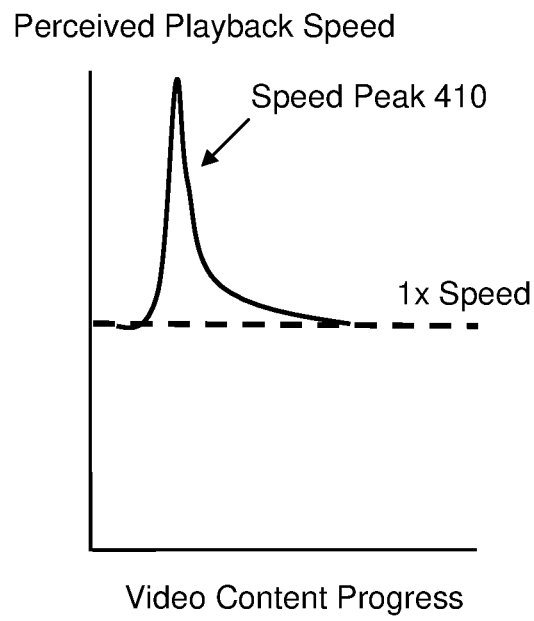
FIGS. 4A-4B illustrate example speed ramps.
Figure 4B:
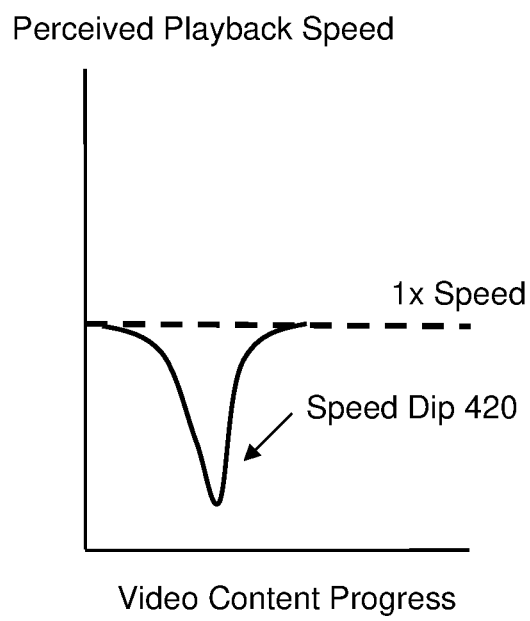

A visual effect that changes the perceived speed of video content playback may include one or more speed ramps. A speed ramp may change the perceived speed of video content playback for a portion of the video content and then return the perceived playback speed to the original perceived playback speed. For example, FIGS. 4A and 4B illustrates example speed ramps. In FIG. 4A, the speed ramp (speed peak 410) may, for a portion of the video content, increase the perceived playback speed above 1× speed and then return the perceived playback speed back to 1× speed. In FIG. 4B, the speed ramp (speed dip 420) may, for a portion of the video content, decrease the perceived playback speed below 1× speed and then return the perceived playback speed back to 1× speed. In some implementations, a speed ramp may change the perceived playback speed to a value different from the original perceived playback speed. Other speed ramps are contemplated.

In some implementations, a visual effect may include one or more visual transformation of the video content. A visual transformation may include one or more visual changes in how the video content is presented during playback. A visual change may be applied for a moment within the playback of the video content or for a duration within the playback of the video content. In some implementations, a visual transformation may include one or more of a visual zoom, a visual filter, a visual rotation, a visual overlay (e.g., text and/or graphics overlay), and/or a visual vibration (e.g., visual shaking).

Visual effects selection component 104 may select one or more visual effects for one or more of the different moments within the music track. The different moments within the music track may correspond to different music events. For example, referring to FIG. 3B, the different moments within music track 300 for which visual effect(s) are selected may correspond to moments corresponding to one or more of music events 312.

Visual effects selection component 104 may select one or more visual effects based on the categories of the music event(s) corresponding to the different moment(s) within the music track and/or other information. For example, referring to FIG. 3B, visual effects selection component 104 may select one or more visual effects based on categories of music events 312. Selecting visual effects based on categories of the music events (e.g., 312) may enable visual effects selection component 104 to select visual effects based on intensities of one or more pulses occurring within the music event and/or other information. For example, visual effects selection component 104 may select visual effects based on intensities of one or more pulses within multiple frequency ranges (e.g., a low frequency range, a middle frequency range, and a high frequency range).

Music events may form an ordered set—any music event may be compared with other music event(s) on an intensity scale. For example, in a given time range, higher intensity music events may be identified for provision of visual effects as disclosed herein. In some implementations, visual effects selection component 104 may distinguish between low-level patterns and high-levels patterns of music events and select different types of visual effects for different levels.

In some implementations, selecting one or more visual effects based on categories of music events/intensities of pulses may include changing the amount of impact of the visual effect on the video content. For example, one or more visual effects may include changes in perceived speed at which the video content is presented during playback, and visual effects selection component 104 may determine the amount of changes in the perceived speed based on the categories of music events/intensities of pulses (e.g., larger speed peaks/dips and/or speed changes based on higher categories/intensities, smaller speed peaks/dips and/or speed changes based on lower categories/intensities). One or more visual effects may include visual transformation of the video content, and visual effects selection component 104 may determine the amount of changes affected by the visual transformation based on the categories of music events/intensities of pulses (e.g., more dramatic/greater visual changes based on higher categories/intensities, less dramatic/smaller visual changes based on lower categories/intensities).

In some implementations, visual effects selection component 104 may select one or more visual effects based on grouping(s) of consecutive pulses within the music track. For example, referring to FIG. 3B, pulses 311 may be grouped into three groups based on similarity of the intensities: pulses 311A, 311B, 311C may be grouped into a high energy group; pulses 311D, 311E, 311F may be grouped into a low energy group; and pulses 311G, 311H may be grouped into an average energy group. Visual effects selection component 104 may select one or more visual effects for pulses 311A, 311B, 311C (music events 312A, 312B, 312C) based on its grouping within the high energy group. Visual effects selection component 104 may select one or more visual effects for pulses 311D, 311E, 311F (music events 312D, 312E, 312F) based on its grouping within the low energy group. Visual effects selection component 104 may select one or more visual effects for pulses 311G, 311H (music events 312G, 312H) based on its grouping within the average energy group.

For example, one or more visual effects may include a change in the perceived playback speed of the video content. The visual effects selected for the high energy group may include increasing the perceived playback speed (e.g., above 1× speed). The visual effect selected for the low energy group may include decreasing the perceived playback speed (e.g., below 1× speed). The visual effect selected for the average energy group may include restoring the perceived playback speed (e.g., to default speed 1×).

As another example, one or more visual effects may include visual transformation of the video content. The visual effects may be selected to match the changes in energy state between the groupings of pulses. For example, one or more visual transformation (e.g., mix, dissolve, crossfade, fade, wipe, rotation, shake) may be selected for transition between different energy groups (e.g., between low, average, high, intense). Other selections of visual effects based on groupings are contemplated.

In some implementations, visual effects selection component 104 may select one or more visual effects based on the location of the groupings within the music track. For example, visual effects selection component 104 may select one or more visual effects based on whether a grouping is located within/near an introduction section, a verse section, a pre-chorus section, a chorus section, a refrain section, a bridge section, an instrumental section, a solo section, a conclusion section, and/or other sections, and/or whether a group is located within/near the transition between different sections of the music track. Other selections of visual effects based on location of groupings are contemplated.

In some implementations, visual effects selection component 104 may select one or more visual effects based on a user selection. A user selection may include selection of visual effect(s) or selection of one or more criteria for selection of visual effect(s). For example, a user may select particular visual effects to for particular moments within the music track or change the visual effects selected by visual effects selection component 104 for particular moments within the music track. A user may select a list of visual effects from which visual effects selection component 104 may make the selection and/or select when/how visual effects selection component 104 selects the visual effect(s) or when/how the visual effects are triggered.

In some implementations, visual effects selection component 104 may select one or more visual effects randomly from a list of visual effects. For example, visual effects selection component 104 may have access to a list of visual effects and may choose the visual effect(s) at random for different moments within the music track. Visual effects selection component 104 may remove from the list of visual effects already selected visual effects or may reduce the priority of reselecting already selected visual effects. Such may enable visual effects selection component 104 to not select the same visual effect repeatedly for a music track.

In some implementations, visual effects selection component 104 may select one or more visual effects based on the duration (e.g., measured in frames/time) of the video content. For example, visual effects selection component 104 may select visual transformations rather than changes in the perceived playback speed based on the video content having a short duration. Visual effects selection component 104 may select changes of perceived playback speeds rather than speed ramps based on the video content have a long duration. In some implementations, visual effects selection component 104 may select one or more visual effects based on the duration of the music track and/or the duration of a slot within a video summary template into which the video content will be placed.

Figure 5A:
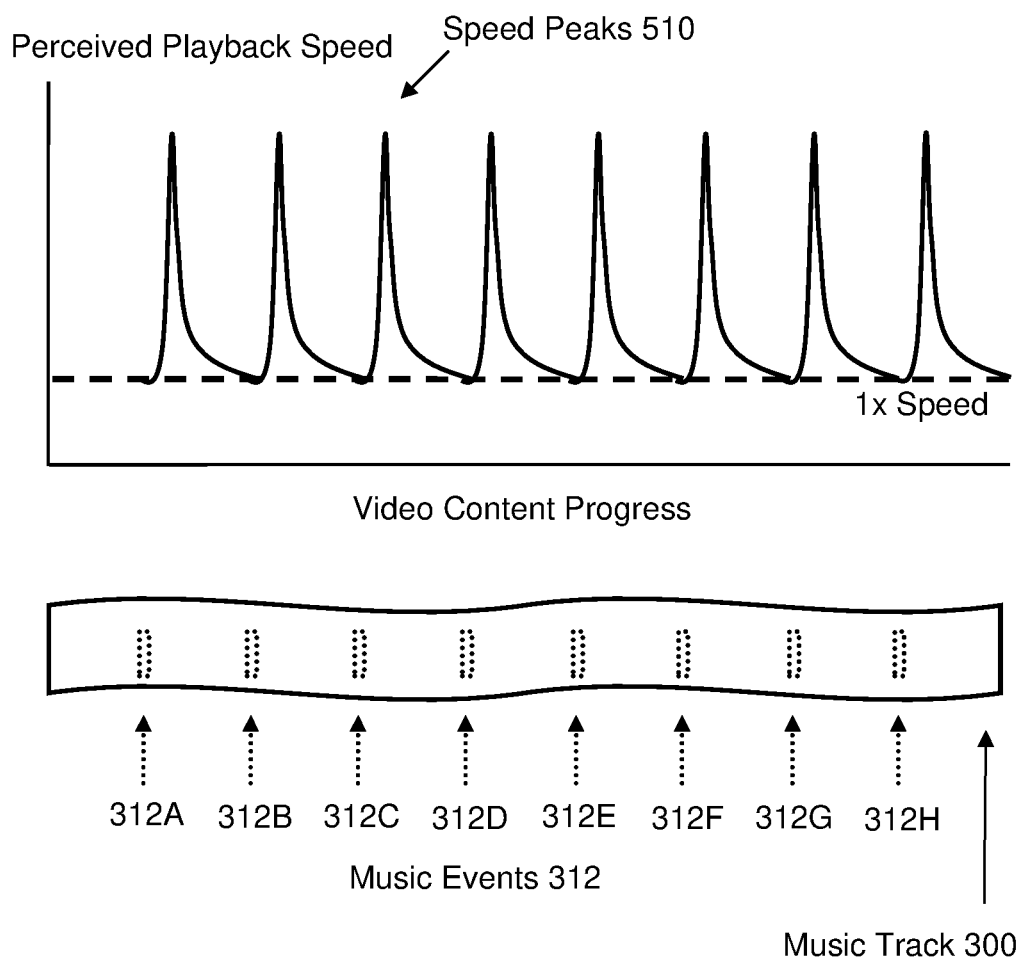
FIG. 5A illustrates example speed peaks applied to video content.

Visual effects application component 106 may be configured to apply one or more visual effects to the video content. Visual effects application component 106 may apply one or more visual effects to one or more moments within the video content aligned to one or more of the different moments that correspond to the music event(s) within the music track. For example, FIG. 5A illustrates example speed peaks 510 applied to the video content. Speed peaks 510 may be applied to individual moments within the video content aligned to different moments that correspond to music events 312A, 312B, 312C, 312D, 312E, 312F, 312G, 312H within music track 300.

Figure 5B:
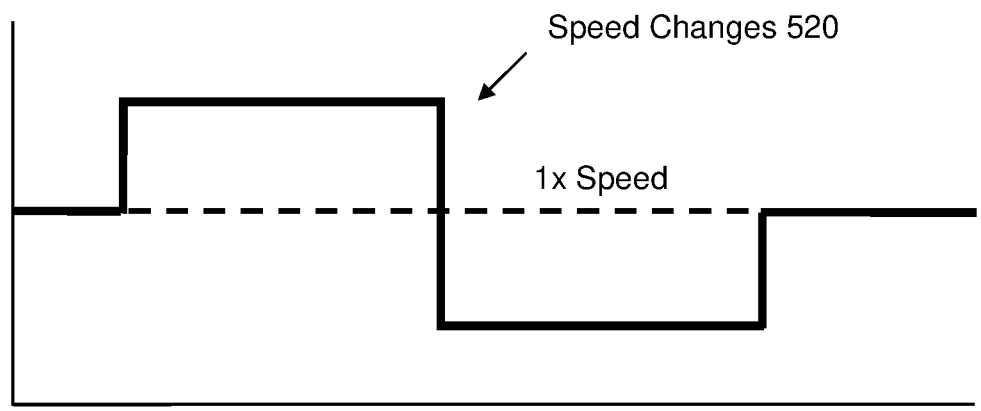
FIG. 5B illustrates example speed changes applied to video content.
Figure 5B:
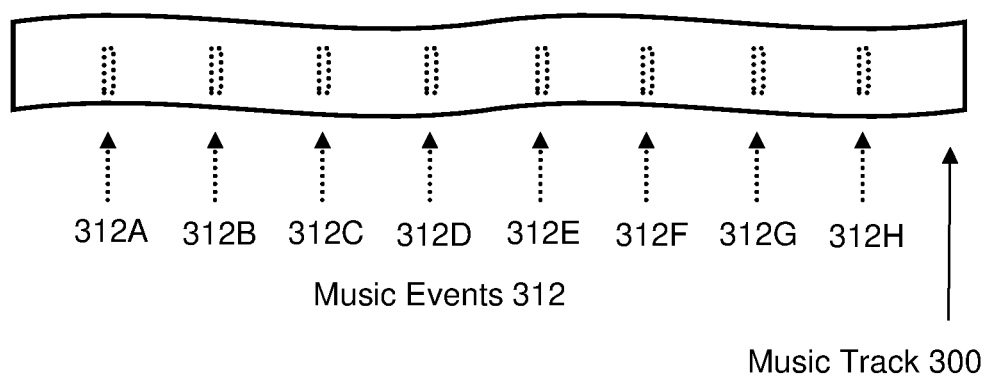

FIG. 5B illustrates example speed changes 520 applied to the video content. Different perceived playback speed within speed changes 520 may be applied to individual moments within the video content aligned to different moments that correspond to music events 312A, 312B, 312C, 312D, 312E, 312F, 312G, 312H. For example, based on music events 312A, 312B, 312C being categorized in a strong category, perceived playback speed greater than 1× speed may be applied to moments within the video content aligned to moments corresponding to music events 312A, 312B, 312C. Based on music events 312D, 312E, 312F being categorized in a weak category, perceived playback speed less than 1× speed may be applied to moments within the video content aligned to moments corresponding to music events 312D, 312E, 312F. Based on music events 312G, 312H being categorized in an average category, perceived playback speed of 1× speed may be applied to moments within the video content aligned to moments corresponding to music events 312G, 312H.

Figure 5C:
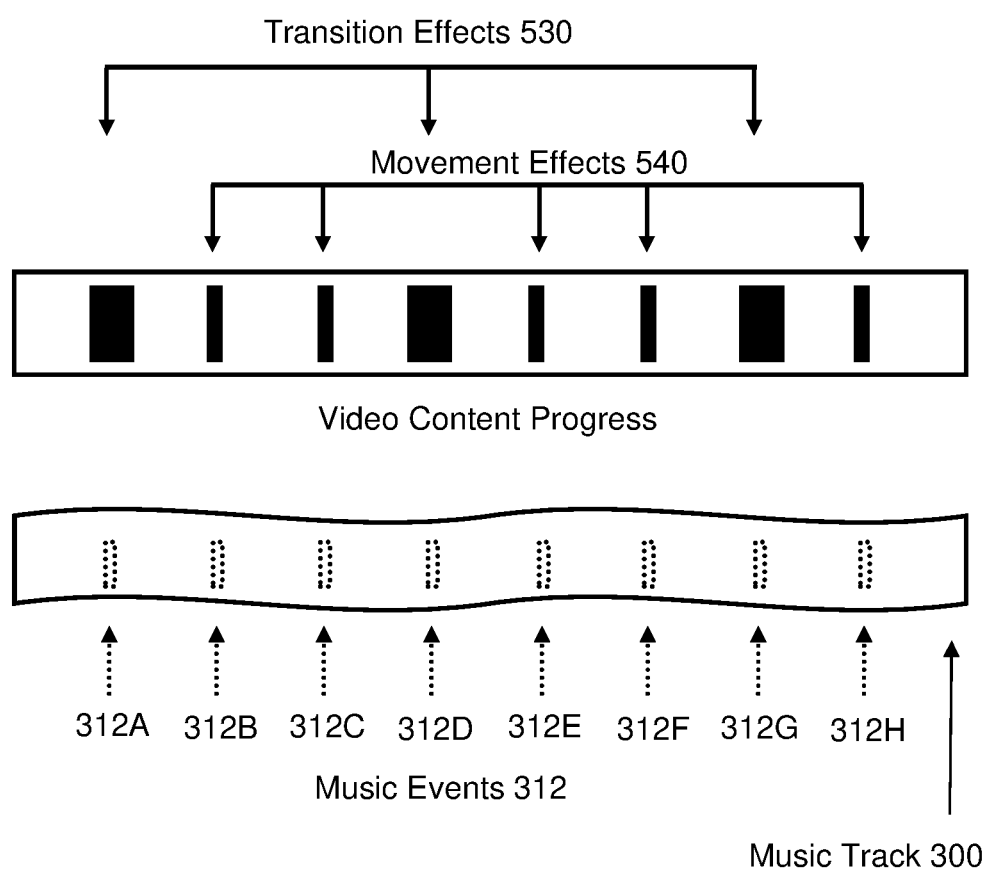
FIG. 5C illustrates example visual transformations applied to video content.

FIG. 5C illustrates example visual transformations (transition effects 530, movement effects 540) applied to the video content. For example, based on changes in energy states of pulses and/or changes in categories of music events 312 within music track 300, transition effects 530 may be applied to individual moments within the video content aligned to different moments that correspond to music events 312A, 312D, 312G. Transition effects 530 may include visual effects that emphasize transitions between energy states of a music track and/or between different portions (e.g., introduction, verse, chorus) of a music track. For example, transition effects 530 may include one or more of mix, dissolve, crossfade, fade, wipe, and/or other transition effects.

Based on categories of music events 312B, 312C, 312E, 312F, 312H within music track 300, movement effects 540 may be applied to individual moments within the video content aligned to different moments that correspond to music events 312B, 312C, 312E, 312F, 312H. Movement effects 540 may include visual effects that emphasize occurrences of particular sounds within a music track. For example, movement effects 540 may include one or more of rotation, shake, and/or other movement effects. The magnitude of the movement effects 540 may be determined based on the intensities of the pulses/categories of the music events 312.

In some implementations, visual effects application component 106 may apply the visual effect(s) to the video content responsive to a user command (e.g., command to create video edits). In some implementations, visual effects application component 106 may apply the visual effect(s) to a preview of the video content (e.g., using lower resolution and/or lower framerate). In some implementations, visual effects application component 106 may apply the visual effect(s) to the video content responsive to a request for playback of the video content and/or at other times. For example, responsive to the request for playback of the video content, visual effects application component 106 may apply the visual effects during the playback/in real time.

Application of the visual effects to the video content may/may not change the original file containing the video content. Visual effects application component 106 may generate one or more files describing the visual effects. For example, visual effects application may generate a file that identifies the visual effects and the portions of the video content to which the visual effects are to be applied. Such files may be used at a subsequent time to apply the visual effects to the video content. Visual effects application component 106 may generate one or more files containing video content altered based on the application of the visual effects. For example, visual effects component 106 may encode the video content to include the visual effects (alter the video content). Visual effects component 106 may encode the altered video content with the music track.

The systems/methods disclosed herein may increase the visual impact of video content and provide for synchronization between audio impact and video impact. The types and locations of visual effects may be determined based on the content of the music tracks. The systems/methods disclosed herein may provide for music driven video time mapping to alter the video content based on what is happening within the music track. The visual intensity/look/feel of the video content may be matched to the music track.

In some implementations, video content may include one or more of spherical video content, virtual reality content, and/or other video content. Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the present disclosure may be directed to video content, one or more other implementations of the system may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, and/or 108 may be eliminated, and some or all of its functionality may be provided by other computer program components. As another example, processor 11 may be configured to execute one or more additional computer program components that may perform some or all of the functionality attributed to one or more of computer program components 102, 104, 106, and/or 108 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
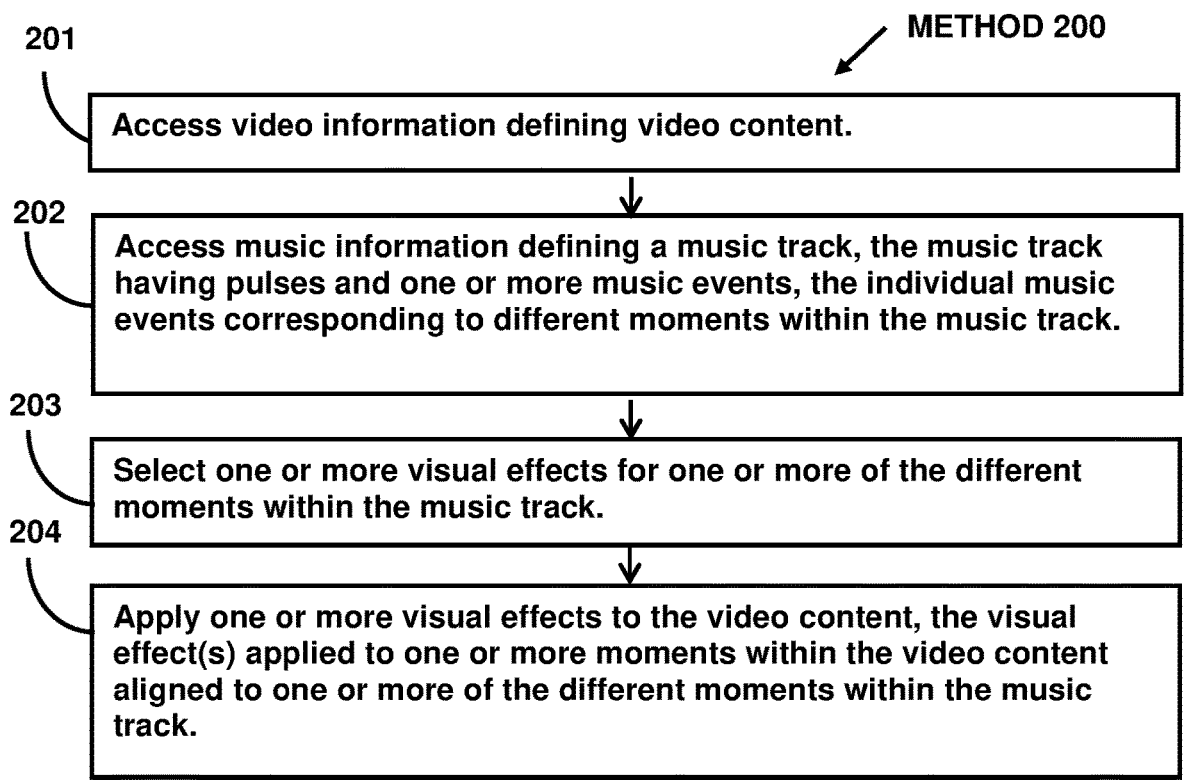
FIG. 2 illustrates a method for modifying videos based on music.

FIG. 2 illustrates method 200 for modifying videos based on music. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining video content may be accessed. The video information may be stored in physical storage media. In some implementation, operation 201 may be performed by a processor component the same as or similar to access component 102 (Shown in FIG. 1 and described herein).

At operation 202, music information defining a music track may be accessed. The music track may provide an accompaniment for the video content. The music track may have pulses and one or more music events. Individual music events may correspond to different moments within the music track. One or more music events may be individually classified into one or more categories based on intensities of one or more pulses occurring within the music event. In some implementations, operation 202 may be performed by a processor component the same as or similar to access component 102 (Shown in FIG. 1 and described herein).

At operation 203, one or more visual effects may be selected for one or more of the different moments within the music track. One or more visual effects may be selected based on the categories of the music event(s). In some implementations, operation 203 may be performed by a processor component the same as or similar to visual effects selection component 104 (Shown in FIG. 1 and described herein).

At operation 204, one or more visual effects may be applied to the video content. One or more visual effects may be applied to one or more moments within the video content aligned to one or more of the different moments within the music track. In some implementations, operation 204 may be performed by a processor component the same as or similar to visual effects application component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for modifying videos based on music, the system comprising:

one or more physical processors configured by machine-readable instructions to:
   access music information defining a music track, the music track providing an accompaniment for video content, the music track having one or more music events, the individual music events corresponding to different moments within the music track, wherein the one or more music events are classified based on intensities within multiple frequency ranges of one or more pulses occurring within the music event;
   select one or more visual effects for the one or more music events within the music track based on the classification of the one or more music events; and
   apply the one or more visual effects to the video content, the one or more visual effects applied to one or more moments within the video content aligned to the one or more music events within the music track.

2. The system of claim 1, wherein the one or more music events are individually classified into one or more categories, the one or more categories including a weak category and a strong category.

3. The system of claim 1, wherein one or more consecutive pulses are grouped based on similarity of the intensities within the multiple frequency ranges.

4. The system of claim 3, wherein the one or more visual effects are selected further based on the grouping of the consecutive pulses.

5. The system of claim 1, wherein the one or more visual effects include one or more changes in a perceived speed at which the video content is presented during playback.

6. The system of claim 5, wherein the one or more changes in a perceived speed at which the video content is presented during playback include one or more speed ramps.

7. The system of claim 1, wherein the one or more visual effects include one or more visual transformations of the video content.

8. The system of claim 7, wherein the one or more visual transformations of the video content include one or more of a visual zoom, a visual filter, a visual rotation, a visual overlay, or a visual vibration.

9. The system of claim 1, wherein the one or more physical processors are further configured by machine-readable instructions to analyze the music track to classify the one or more music events.

10. The system of claim 1, wherein the multiple frequency ranges include a low frequency range, a middle frequency range, and a high frequency range.

11. A method for modifying videos based on music, the method comprising:
   accessing music information defining a music track, the music track providing an accompaniment for video content, the music track having one or more music events, the individual music events corresponding to different moments within the music track, wherein the one or more music events are classified based on intensities within multiple frequency ranges of one or more pulses occurring within the music event;
   selecting one or more visual effects for the one or more music events within the music track based on the classification of the one or more music events; and
   applying the one or more visual effects to the video content, the one or more visual effects applied to one or more moments within the video content aligned to the one or more music events within the music track.

12. The method of claim 11, wherein the one or more music events are individually classified into one or more categories, the one or more categories including a weak category and a strong category.

13. The method of claim 11, wherein one or more consecutive pulses are grouped based on similarity of the intensities within the multiple frequency ranges.

14. The method of claim 13, wherein the one or more visual effects are selected further based on the grouping of the consecutive pulses.

15. The method of claim 11, wherein the one or more visual effects include one or more changes in a perceived speed at which the video content is presented during playback.

16. The method of claim 15, wherein the one or more changes in a perceived speed at which the video content is presented during playback include one or more speed ramps.

17. The method of claim 11, wherein the one or more visual effects include one or more visual transformations of the video content.

18. The method of claim 17, wherein the one or more visual transformations of the video content include one or more of a visual zoom, a visual filter, a visual rotation, a visual overlay, or a visual vibration.

19. The method of claim 11, further comprising analyzing the music track to classify the one or more music events.

20. The method of claim 11, wherein the multiple frequency ranges include a low frequency range, a middle frequency range, and a high frequency range.

* * * * *